United States Patent [19]
Herd et al.

[11] Patent Number: 5,856,472
[45] Date of Patent: Jan. 5, 1999

[54] REACTIVE ALUMINUM PHTHALOCYANINE DYESTUFFS, PROCESSES FOR THEIR PREPARATION AND THEIR USE

[75] Inventors: Karl-Josef Herd, Odenthal; Klaus Saitmacher, Kriftel, both of Germany

[73] Assignee: DyStar Textilfarben GmbH & Co. Deutschland KG, Germany

[21] Appl. No.: 874,462

[22] Filed: Jun. 16, 1997

[30] Foreign Application Priority Data

Jun. 16, 1996 [DE] Germany .................. 196 24 469.2

[51] Int. Cl.$^6$ .................... C09B 47/08; C09B 47/28
[52] U.S. Cl. .............. 540/140; 540/123; 540/124; 540/125; 540/126; 540/128; 540/131; 540/134
[58] Field of Search .................. 540/140, 123, 540/124, 125, 126, 128, 131, 134

[56] References Cited

U.S. PATENT DOCUMENTS

| | | | |
|---|---|---|---|
| 4,237,050 | 12/1980 | Springer | 260/242.2 |
| 4,350,632 | 9/1982 | Springer | 260/314.5 |
| 4,745,187 | 5/1988 | Springer | 540/123 |
| 5,444,163 | 8/1995 | Dornhagen et al. | 540/133 |
| 5,453,501 | 9/1995 | Jäger | 540/126 |
| 5,563,260 | 10/1996 | Kaul et al. | 540/133 |

FOREIGN PATENT DOCUMENTS

| | | |
|---|---|---|
| 2 135555 | 5/1995 | Canada . |
| 761 767 | 8/1996 | European Pat. Off. . |
| 43 40 160 | 4/1995 | Germany . |
| 43 38 853 | 5/1995 | Germany . |
| 195 21 056 | 12/1995 | Germany . |
| 196 22 180 | 12/1996 | Germany . |
| 1 060 086 | 2/1967 | United Kingdom . |
| 2 290 548 | 6/1995 | United Kingdom . |
| 2 290 548 | 1/1996 | United Kingdom . |
| 22905408 | 1/1996 | United Kingdom . |

*Primary Examiner*—Mukund J. Shah
*Assistant Examiner*—Pavanaram K. Sripada
*Attorney, Agent, or Firm*—Connolly & Hutz

[57] ABSTRACT

Novel aluminum phthalocyanine reactive dyestuffs of the formula (1)

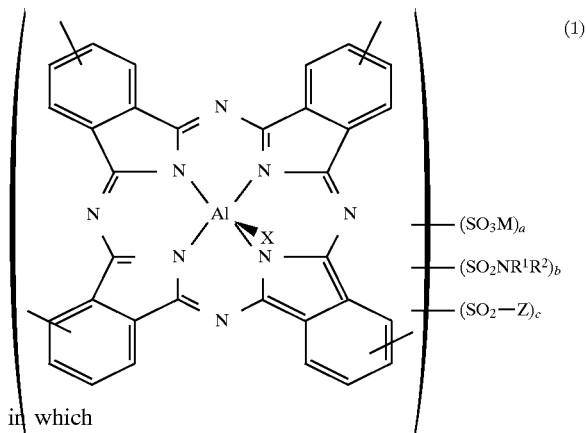

in which x is Cl or OH;

Z is vinyl or a group of the formula —$CH_2CH_2$—Y, in which Y is a substituent which can be eliminated under alkaline conditions, c is a number from 0.5 to 4;

M is a hydrogen, an alkali metal or a substituted or unsubstituted ammonium ion; and $R^1$ and $R^2$ independently of one another are hydrogen, substituted or unsubstituted $C_1$–$C_6$ alkyl, a $C_1$–$C_6$-alkyl which is substituted by one or two radicals of the formulae OH, $SO_3M$ or $OSO_3M$, a substituted or unsubstituted phenyl or a radical of the formulae (2), (3) or (4)

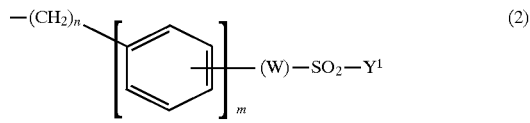

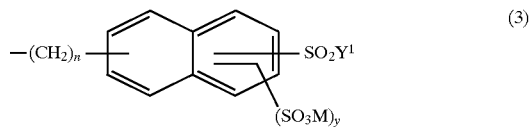

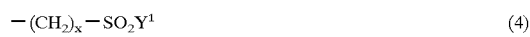

14 Claims, No Drawings

REACTIVE ALUMINUM PHTHALOCYANINE DYESTUFFS, PROCESSES FOR THEIR PREPARATION AND THEIR USE

The invention relates to novel fiber-reactive aluminium phthalocyanine dyestuffs, their preparation and their use. The use of phthalocyanine compounds containing heavy metals, in particular copper phthalocyanine and nickel phthalocyanine, in reactive dyestuffs is known. For example, U.S. Pat. Nos. 4,237,050, 4,350,632 and 4,745,187 describe fiber-reactive heavy metal phthalocyanine dyestuffs which have a fiber-reactive group of the vinylsulfone series bonded via an N-arylsulfonamide or N-alkylsulfonamide radical. Chiefly turquoise-colored and green color shades are achieved with these reactive dyestuffs in the dyeing of cotton. Dyeings with these dyestuffs have good fastness properties, in particular light-fastness properties. Although the heavy metals are bonded in these dyestuffs in the form of a stable complex, copper and, in particular, nickel are regarded as ecologically problematic nowadays. The heavy metal ions can thus be liberated during the process of biodegradation or combustion of used textiles comprising these dyestuffs and hence pollute the environment.

For this reason, phthalocyanine dyestuffs which either have no heavy metals at all as the central atom (DE-A-4 340 160) or contain ecologically and toxicologically acceptable metals bonded in complex form, such as, for example, iron, titanium, zinc (CA-A-2 135 555) or aluminum (GB-A-2 290 548), have been developed. However, the reactive dyestuffs which have been prepared on the basis of these phthalocyanine chromophores do not achieve the use properties of the corresponding Cu and Ni phthalocyanine dyestuffs.

The object of the present invention was to provide novel water-soluble fiber-reactive phthalocyanine dyestuffs which are acceptable from ecological standpoints and at the same time have good use properties.

This object has been achieved by the aluminum phthalocyanine dyestuffs described below. Surprisingly, they have good to very good fastness properties, in particular light-fastness properties, and even have a better color strength profile and a better color build-up, in particular at low dyeing temperatures, such as, for example, 40° to 60° C., compared with the Cu and Ni phthalocyanine dyestuffs. The dyestuffs according to the invention are also particularly suitable for combination dyeings.

The present invention relates to aluminum phthalocyanine reactive dyestuffs of the formula (1)

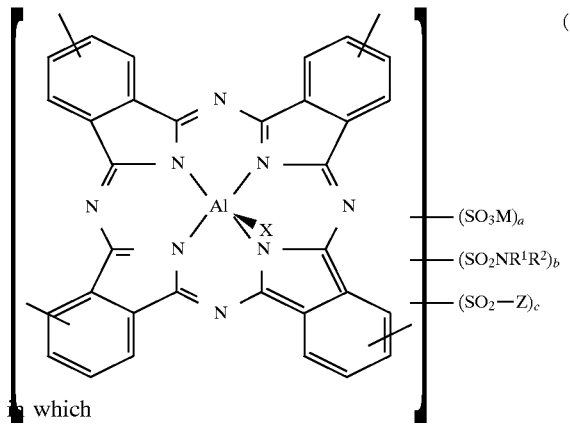

in which
X is Cl or OH;
Z is vinyl or a group of the formula —$CH_2CH_2$—Y, in which Y is a substituent which can be eliminated under alkaline conditions, in particular chlorine, sulfato, thiosulfato, acetato or phosphate, preferably sulfato; or Y is the group sulfo, hydroxyl or —NR—T, in which T is a fiber-reactive heterocyclic radical and R is hydrogen, $C_1$–$C_6$-alkyl or a $C_1$–$C_6$-alkyl which is substituted by OH, $SO_3M$, $OSO_3M$, COOM, $OCH_3$ or $OC_2H_5$;

a is a number from 0 to 3;
b is a number from 0 to 4;
c is a number from 0.5 to 4;
M is hydrogen, an alkali metal or a substituted or unsubstituted ammonium ion; and
$R^1$ and $R^2$ independently of one another are hydrogen, $C_1$–$C_6$alkyl, a $C_1$–$C_6$-alkyl which is substituted by one or two radicals of the formulae OH, $SO_3M$ or $OSO_3M$, phenyl, a phenyl which is substituted by one to three radicals of the formulae OH, $SO_3M$ or COOM or a radical of the formulae (2), (3) or (4)

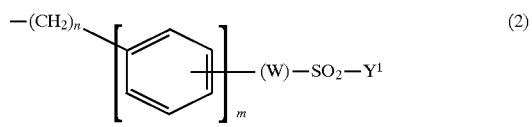

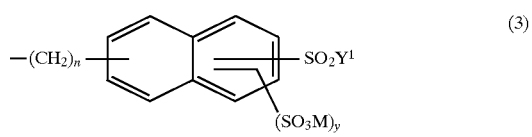

in which
n is a number from 0 to 3,
m is the number 0 or 1,
where the sum n+m is 1,2, 3 or 4,
x is an integer from 2 to 6,
y is a number from 0 to 3,
W is $C_1$–$C_6$-alkylene, —$(CH_2)_2$—O—$(CH_2)_2$— or a chemical bond and
$Y^1$ is —CH=$CH_2$, —$CH_2CH_2$Cl, —$CH_2CH_2$OH or —$CH_2CH_2OSO_3M$;
or $R^1$ and $R^2$, together with the adjacent nitrogen atom, form a 3- to 9-membered, preferably 5- to 7-membered, saturated or unsaturated N-heterocyclic radical, or, with a further hetero group from the series consisting of —O—, —S—, —$SO_2$—, —N= and —$NR^3$, in which $R^3$ is hydrogen, $C_1$–$C_4$-alkyl, $C_1$–$C_4$-hydroxyalkyl, $C_1$–$C_4$-chloroalkyl or $C_1$–$C_4$-sulfatoalkyl, form a 5- to 8-membered, preferably 5- or 6-membered, saturated or unsaturated heterocyclic radical.

The individual formula members can have meanings which are identical to one another or different from one another in the scope of their meaning. The phthalocyanine dyestuffs according to the invention are as a rule obtained in the form of mixtures of the individual compounds of the formula (1), these individual compounds differing from one another by the degree of substitution of the sulfo and sulfonamide groups on the phthalocyanine radical. The formulae of the phthalocyanine dyestuffs according to the invention therefore have indices which as a rule are fractions.

Preferred dyestuffs of the formula (1), are those in which
X is OH;
Z is —CH=$CH_2$, —$CH_2CH_2$Cl, —$CH_2CH_2OSO_3M$, —$CH_2CH_2SSO_3M$, —$CH_2CH_2$— $OCOCH_3$, —CH$_2$CH$_2$—OPO$_3$M, —NR-triazinyl or NR-pyrimidinyl, in which the triazinyl and pyrimidinyl radicals are substituted by halogens, amino groups and/or cyano groups;

the sum a+b+c is a number between 2.0 and 4.0;

M is hydrogen, lithium, sodium, potassium, ammonium, a mono-, di-, tri- or tetramethylammonium ion, a mono-, di-, tri- or tetraethylammonium ion or a mono-, di- or triethanolammonium ion and R$^1$ and R$^2$ independently of one another are hydrogen, C$_1$–C$_4$-alkyl, C$_1$–C$_4$-sulfoalkyl or C$_1$–C$_4$-sulfatoalkyl, or, together with the adjacent N-atom are a heterocyclic radical of the formulae

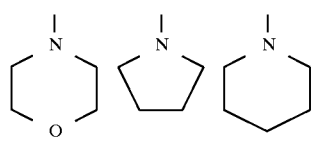

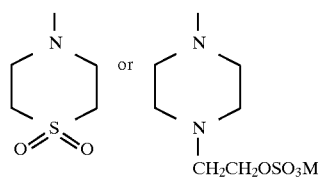

Dyestuffs of the formula (1) which are of particular interest are those in which X is OH;

a is a number from 0 to 3;

b is the number 0;

c is a number from 0.5 to 4;

Z is —CH=CH$_2$ or —CH$_2$CH$_2$—OSO$_3$M and

M is hydrogen, sodium or potassium.

Dyestuffs of the formula (1) which are furthermore of particular interest are those in which X is OH;

a is a number from 0 to 3;

b is the number 0;

c is a number from 0.5 to 4.0;

Z is a group of the formula CH$_2$CH$_2$NR$^4$T$^1$, in which R$^4$ is H, CH$_3$, C$_2$H$_5$, C$_3$H$_7$, CH$_2$CH$_2$OH, CH$_2$CH$_2$SO$_3$M, CH$_2$CH$_2$OSO$_3$M or CH$_2$COOM and T$^1$ is a radical of the formulae

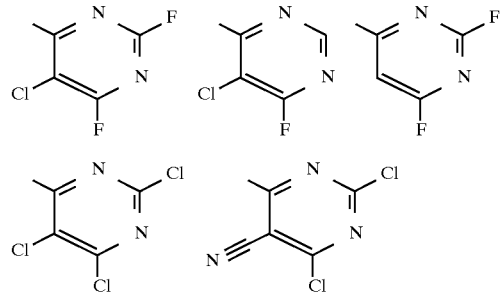

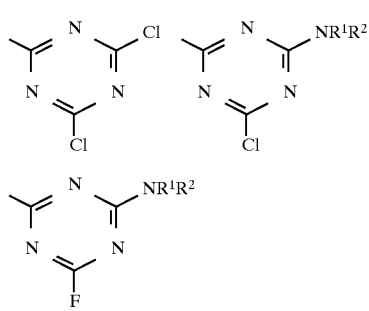

and M is as defined above.

Dyestuffs of the formula (1) which are furthermore of particular interest are those in which X is OH;

a is a number from 0 to 3;

b is a number from 0.5 to 2.0;

c is a number from 0.5 to 4.0;

R$^1$ and R$^2$ independently of one another are H, CH$_3$, C$_2$H$_5$, CH$_2$CH$_2$SO$_3$M or CH$_2$CH$_2$OSO$_3$M, or, together with the adjacent N atom, form a heterocyclic radical of the formula

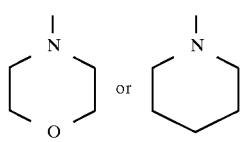

and

M and Z have one of the meanings mentioned.

Dyestuffs of the formula (1) which are furthermore of particular interest are those in which X is OH;

a is a number from 0 to 3;

b is a number from 0.5 to 2.0;

c is a number from 0.5 to 4.0;

R$^1$ is hydrogen;

R$^2$ is a radical of the formula (2) or (4), in which x is the number 2, m is the number 1, n is the number 0, W is a chemical bond and Y$^1$ is vinyl or β-sulfatoethyl;

Z is vinyl or β-sulfatoethyl and

M is as defined above.

The present invention also relates to a process for the preparation of a compond of the formula (1), which comprises reducing the acid chloride of the formula (5)

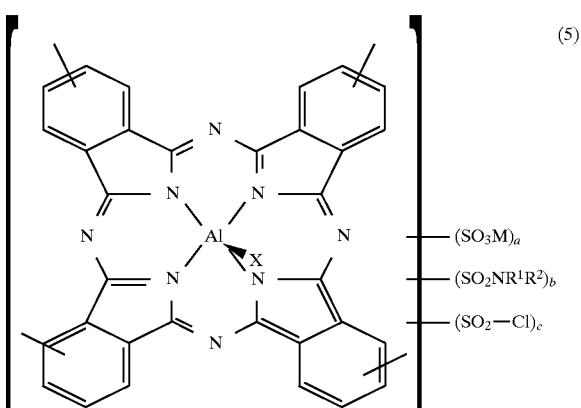

the sulfinic acid of the formula (6)

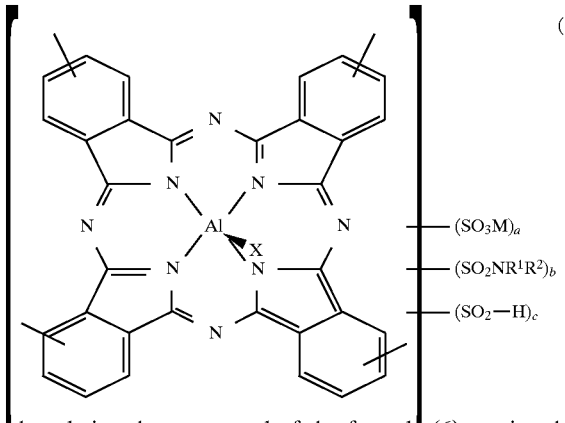

ethoxylating the compound of the formula (6) to give the compound of the formula (1a)

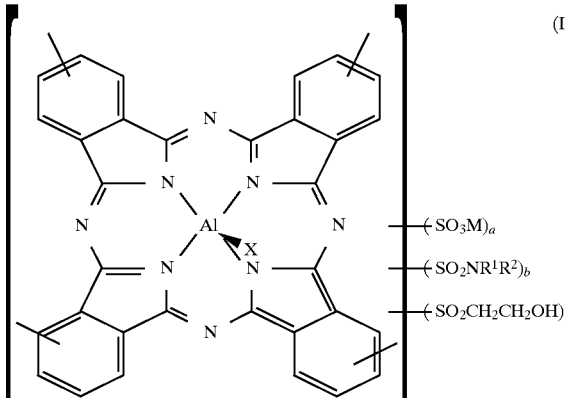

and if appropriate chlorinating, sulfating, thiosulfating, phosphorylating or acetylating the compound of the formula (1a), a compound of the formula (1) where Z is —CH₂CH₂Cl, —CH₂CH₂OSO₃M, —CH₂CH₂SSO₃M, —CH₂CH₂OPO₃M or —CH₂COOM being formed, which, if appropriate, is subjected to an elimination reaction a compound of the formula (1) where Z is vinyl being formed, if appropriate reacting a compound of the formula (1) where Z is vinyl, β-sulfatoethyl, β-thiosulfatoethyl, β-phosphatoethyl or β-acetatoethyl with an amine of the formula H₂NR, a compound of the formula (1) where Z is —CH₂CH₂NHR being formed, which, after its intermediate isolation, is reacted with a heterocyclic compound of the formula Hal-T, where Hal is chlorine or fluorine, a compound of the formula (1) where Z is —CH₂CHNR—T being formed;

or, to prepare a compound of the formula (1) where Z is —CH₂CH₂SO₃M, either reacting a compound of the formula (6) with 1-chloroethane-2-sulfonic acid, or reacting a compound of the formula (1) where Z is vinyl with M₂SO₃, preferably Na₂SO₃.

According to this preparation variant, the sulfonamide radicals —SO₂NR¹R² corresponding to the number b are already contained in the starting compound.

In an alternative preparation variant, a compound of the formula (7)

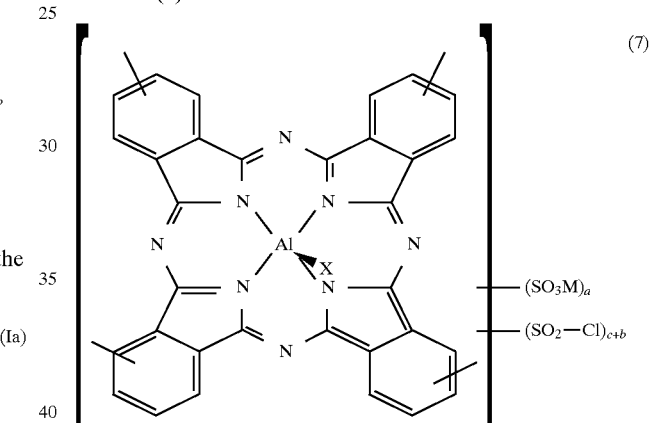

which contains (c+b) SO₂Cl groups is used as the starting substance and this compound is reacted with a stoichiometric amount, corresponding to the desired number b, of an amine of the formula HNR¹R², a compound of the formula (5) being formed, which is further reacted as described above to give a compound of the formula (1).

It is also possible first to partly reduce said compound of the formula (7) with a stoichiometric amount, corresponding to the desired number c, of the reducing agent to give the sulfinic acid and then to react the product with an amine of the formula HNR¹R², which can also be employed in excess, a compound of the formula (6) being formed, which is then further reacted as described above to give a compound of the formula (1).

Compounds of the formula (1b)

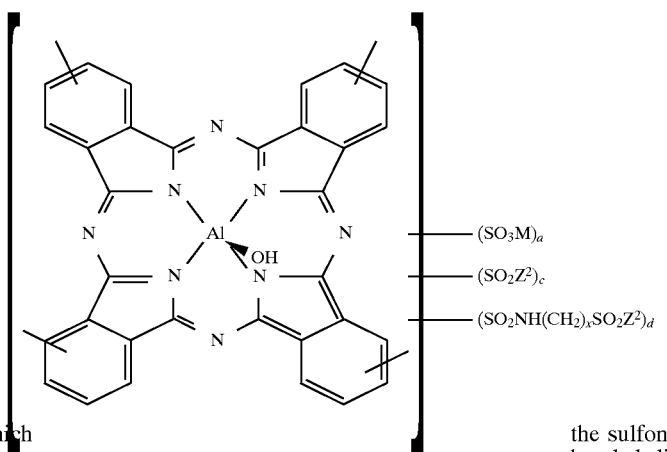

in which a is a number from 0 to 3.0;

c is a number from 0.5 to 4.0;

d is a number from 0.5 to 2.0;

x is a number from 2 to 6, preferably 2;

$Z^2$ is vinyl or β-sulfatoethyl and M is as defined above, are preferably prepared by reacting a compound of the formula (7a)

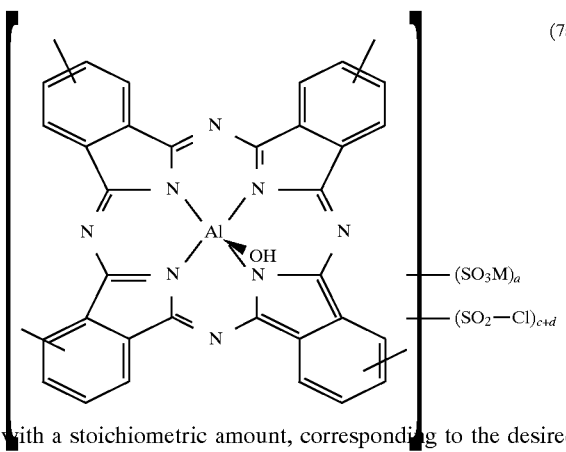

with a stoichiometric amount, corresponding to the desired number d, of an alkylaminosulfonic acid of the formula $H_2N—(CH_2)_x—SO_3M$ under alkaline conditions to give a compound of the formula (8),

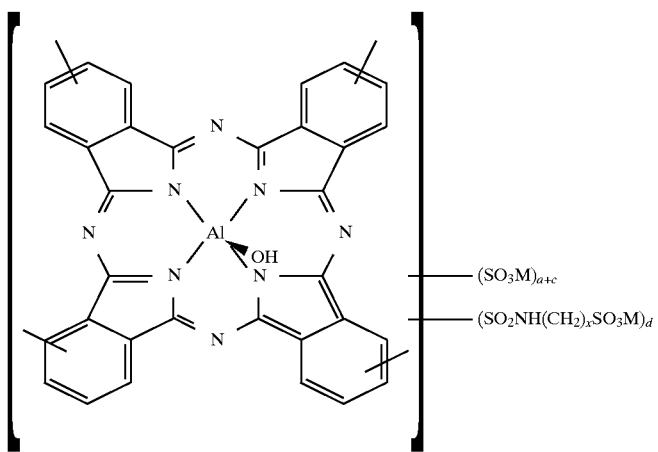

the $SO_2Cl$ groups corresponding to the number c being hydrolyzed, reacting the compound of the formula (8) with chlorosulfonic acid and thionyl chloride, the sulfo groups of the sulfonamidoalkyl radical and some of the sulfo groups bonded directly to the phthalocyanine chromophore being converted into $SO_2Cl$ groups; reducing the resulting reaction product with a reducing agent, preferably sodium sulfite, sulfinic acid groups being formed from the $SO_2Cl$ groups; ethoxylating the resulting reaction product, the sulfinic acid radicals being converted into hydroxyethylsulfonyl radicals; and subsequently sulfating the product, preferably with sulfuric acid, compounds of the formula (1b) where $Z^2$ is β-sulfatoethyl being formed. A compound of the formula (1b) where $Z^2$ is vinyl is formed by elimination.

In the process variants described above, the reduction steps are preferably carried out with sodium sulfite, sodium bisulfite, sodium dithionite or the corresponding potassium salts in equimolar amounts or in up to a 10-fold molar excess, based on the number of groups to be reduced, of reducing agent, expediently at a pH of between 8 and 12 and at a temperature of 10° to 50° C.

In the process variants described above, the ethoxylation reactions are preferably carried out with ethylene oxide, chloroethanol or ethylene carbonate in equimolar amounts or in up to a 3-fold molar excess, based on the number of groups to be ethoxylated, of ethoxylating agent, expediently at a pH of between 7 and 9 and at a temperature of 50° to 70° C.

In the process variants described above, the sulfation reactions are preferably carried out with 80 to 100% strength by weight sulfuric acid, in particular sulfuric acid monohydrate or oleum, in equimolar amounts or in up to a 10-fold molar excess, based on the number of groups to be sulfated, of sulfating agent, expediently at a temperature of 0° to 20° C.

In the process variants described above, the chlorination reactions are preferably carried out with thionyl chloride in equimolar amounts or in up to a 10-fold molar excess, based on the number of groups to be chlorinated, at a temperature of 0° to 80° C.

The dyestuffs according to the invention are suitable for dyeing or printing material containing hydroxyl and/or carboxamide groups, preferably cellulosic fiber materials and polyamide. The dyestuffs produce brilliant, green to turquois-colored dyeings and prints, which are distinguished by good degrees of fixing and fastness properties, on the materials mentioned. In particular, the dyestuffs are distinguished by the fact that no heavy metal ions are released into the environment during the dyeing or printing process and also during biodegradation of the textiles after their use.

The dyestuffs according to the invention can be applied to the material or incorporated into the material by customary dyeing methods and fixed on or in the material by means of heat or with the aid of an agent having an alkaline action, or by both measures.

In the following examples, parts are parts by weight and the data in percent are percentages by weight, unless noted otherwise. Parts by weight bear the same relation to parts by volume as the kilogram to the liter.

EXAMPLES

Preparation of the compounds of the formula (7) and (7a)

The precursors for the dyestuffs according to the invention are obtained by way of example as follows:

a.) Aluminum phthalocyanine is introduced into chlorosulfonic acid and the mixture is stirred at temperatures between 100° C. and 150° C., preferably at temperatures between 120° C. and 140° C., for several hours, preferably 3 to 5 hours. Thionyl chloride is then added dropwise and stirring is continued for several hours, preferably about 2 to 4 hours, at temperatures between 70° C. and 90° C. The mixture is poured onto ice and the aluminum phthalocyanine sulfochloride is filtered off with suction.

b.) Alternatively, the aluminum phthalocyanine sulfochloride can be obtained by sulfochlorination with chlorosulfonic acid. However, the reaction with thionyl chloride is not carried out. A product which, in addition to the sulfochlorine groups, also has free sulfonic acid groups is obtained. These do not react during the reaction with sulfite and are retained during the subsequent reactions.

In the process variants described above, an aluminum phthalocyanine where X is Cl is formed. In the reaction of the AlPcCl sulfochloride in an aqeuous or alkaline-aqueous medium, Cl is replaced by OH.

Example 1
Aluminum phthalocyanine 157 parts of phthalodinitrile are mixed intimately and ground with 52 parts of aluminum(III) chloride and 600 parts of sodium sulfate. The mixture is then heated to 250° C. in the course of one hour.

The reaction mixture is kept at this temperature for a further 90 minutes. After cooling, the mass is removed from the reaction vessel and ground. The dark powder is introduced into 1,000 parts of water at 95° C., and the mixture is stirred for 15 minutes and filtered with suction. The residue is taken up in 1,000 parts of 5N hydrochloric acid and the mixture is stirred for 1 hour. The product is filtered off with suction again, introduced into 1,000 parts of hot water at 95° C., filtered off with suction and then dried at 60° C. in vacuo.

Example 2a
Aluminum phthalocyanine trisulfochloride 59 parts of aluminum phthalocyanine from Example 1 are introduced into 275 parts of chlorosulfonic acid and the mixture is heated to 95° C. Stirring is continued at this temperature for 15 minutes and the mixture is then heated further to 135° C. After 5 hours, it is cooled to 80°–85° C. and 83 parts of thionylchloride are slowly added dropwise in the course of 45 minutes. After cooling to room temperature, the reaction mixture is introduced onto 1,200 parts of ice and the product is filtered off with suction and washed with 1,000 parts of ice-water. The pH of the last wash water fraction is in the range from 2 to 3. The moist aluminum phthalocyanine trisulfochloride isolated is further reacted as in Example 3a.

Example 2b
Aluminum phthalocyanine sulfochloride/sulfonic acid (2.2:1.2)

59 parts (0.1 mol) of aluminum phthalocyanine from Example 1 are introduced into 525 parts of chlorosulfonic acid and the reaction mixture is heated to 135° C. It is stirred at this temperature for 6 hours. After cooling to room temperature, the reaction mixture is introduced onto 1,200 parts of ice and the product is filtered off with suction and washed with 1,000 parts of 1N hydrochloric acid. The pH of the last washwater fraction is in the range from 2 to 3. The moist aluminum phthalocyanine sulfochloride/sulfonic acid (2.2:1.2) isolated is further reacted in Example 3b.

Example 3a
Aluminum phthalocyanine sulfinate 133 parts of sodium sulfite are introduced into 2,000 parts of water with 97 parts of sodium bicarbonate. 180 parts of moist aluminum phthalocyanine trisulfochloride from Example 2a are introduced at 10° to 15 C. in the course of 30 minutes. The reaction mixture is stirred at 10° to 15° C. for 5 hours and at room temperature for 15 hours and then at 40° C. for 30 minutes.

After cooling to room temperature, the pH is brought to 1 with 310 ml of concentrated HCl and the mixture is stirred at room temperature for 1 hour. It is washed three times with 500 parts of 1N hydrochloric acid. The moist product is used directly for the further reaction.

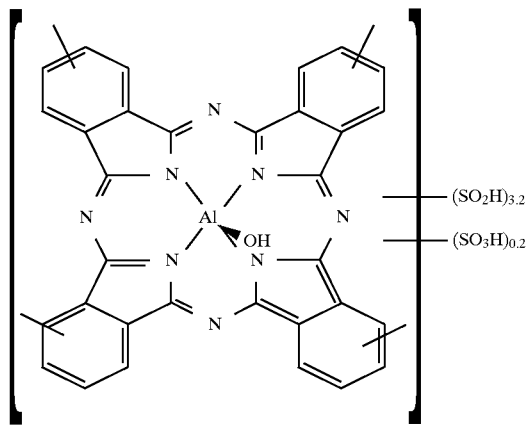

Example 3b
Aluminum phthalocyanine sulfinate/sulfonate (2.2:1.2)

133 parts of sodium sulfite are introduced into 2,000 parts of water with 97 parts of sodium bicarbonate. 180 parts of moist aluminum phthalocyanine sulfochloride/sulfonic acid (2.2:1.2) from Example 2b are introduced at 10° to 15° C. in the course of 30 minutes. The reaction mixture is stirred at 10° to 15° C. for 5 hours and at room temperature for 15 hours and then at 40° C. for 30 minutes. After cooling to room temperature, the pH is brought to 1 with 310 ml of concentrated HCl and the mixture is stirred at room temperature for 1 hour. It is washed with three portions of 500 parts of 1N hydrochloric acid. The moist product is used directly for the further reaction.

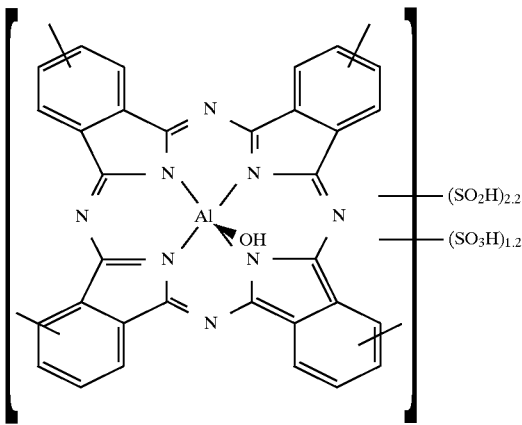

Example 4a
Reaction with chloroethanol and esterification 190 parts of aluminum phthalocyanine sulfinate from Example 3a are introduced into 2,000 parts of water and a pH of 7.3 is established with 2N NaOH. 56.4 parts of 2-chloroethanol are then added dropwise and the temperature is increased to 65° C. Throughout the entire reaction time of 20 hours, the pH is kept at 9.5–9.6 with 2N sodium hydroxide solution. The mixture is then brought to pH 6.8 with dilute hydrochloric acid and the precipitate is filtered off with suction and dried. A product of the formula

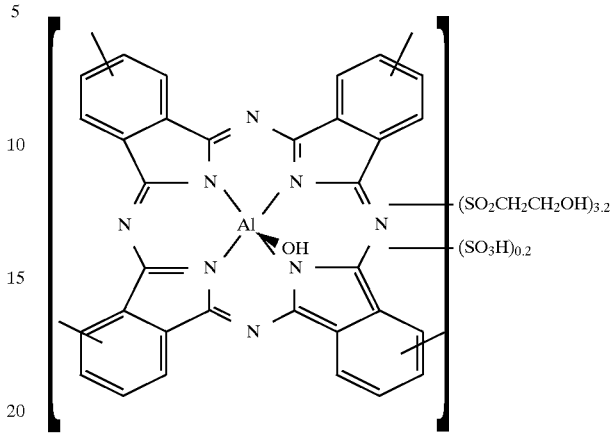

is obtained.

91 parts of this dyestuff are then introduced into 540 parts of sulfuric acid monohydrate at 15° to 20° C. and the mixture is stirred at 20° C. for 12 hours. The reaction mixture is poured onto 2,600 parts of ice and the precipitate is filtered off with suction and washed with a total of 2,500 ml of 5% strength hydrochloric acid. The press-cake is introduced into 750 parts of water again and dissolved at a pH of 6 with 2N sodium hydroxide solution. The reactive dyestuff is isolated by drying in a vacuum cabinet or by salting out.

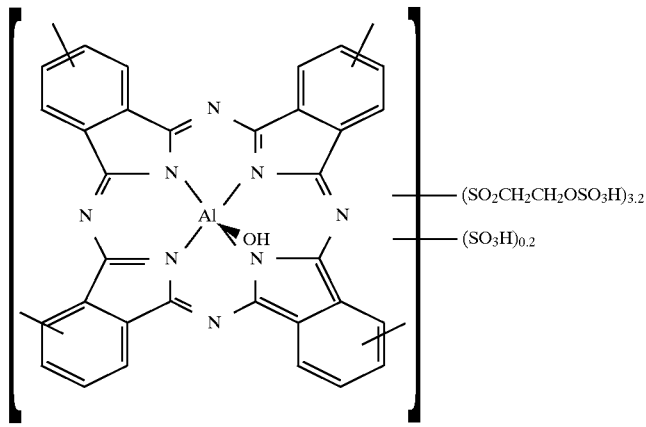

A dark green product with a lambda$_{max}$=676 nm in H$_2$O is obtained. The reactive dyestuff is readily soluble in water and gives brilliant green prints and dyeings with good fastness properties on cotton fibers.

Example 4b
Reaction with chloroethanol and esterification 190 parts of aluminum phthalocyanine sulfinate/sulfonate (2.2:1.2) from Example 3b are introduced into 2,000 parts of water and a pH of 7.3 is established with 2N NaOH. 56.4 parts of 2-chloroethanol are then added dropwise and the temperature In is increased to 65° C. During the entire reaction time of 20 hours, the pH is kept at 9.5–9.6 with 2N sodium hydroxide solution. The mixture is then brought to pH 6.8 with dilute hydrochloric acid and the precipitate is filtered off with suction and dried at 50° C. in a vacuum cabinet. A product of the formula

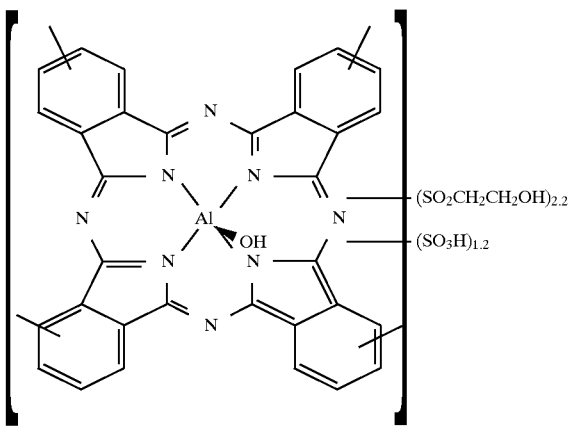

is obtained.

91 parts of this dyestuff are then introduced into 540 parts of sulfuric acid monohydrate at 15° to 20° C. and the mixture is stirred at 20° C. for 12 hours. The reaction mixture is poured onto 2,600 parts of ice and the precipitate is filtered off with suction and washed with a total of 2,500 ml of 5% strength hydrochloric acid. The press-cake is introduced into 750 parts of water again and dissolved at a pH of 6 with 2N sodium hydroxide solution. The reactive dyestuff is isolated by drying in a vacuum cabinet or by salting out.

A dark green product with a $lambda_{max}=678$ nm is obtained. The reactive dyestuff is readily soluble in water and gives brilliant green prints and dyeings with good fastness properties on cotton fibers.

Example 5

Aluminum phthalocyanine sulfonamidoethylsulfinate 180 parts of aluminum phthalocyanine trisulfochloride from Example 2a are introduced into 300 parts of water at 5° to 10° C. A pH of 8 is established with sodium bicarbonate, and 45 parts of taurine are added dropwise at 10° to 15° C. in the course of 5 minutes. The mixture is then heated at 40° C. for 3 hours. The reaction product is filtered off with suction and salted out with sodium chloride. After drying, the product is introduced into 200 parts of chlorosufonic acid, during which the temperature does not rise above 20° C. The mixture is then heated to 60° C. and 8 ml of thionyl chloride are added dropwise. The temperature is kept at 80° C. under reflux for 1 hour. After cooling, the reaction mixture is introduced onto 2,000 parts of ice and the product is filtered off with suction and washed with 1,500 parts of 1N hydrochloric acid. The moist press-cake is introduced into a solution of 1,000 parts of water and 110 parts of sodium sulfite at 10° C. A pH of 8 to 8.5 is established with sodium bicarbonate. The reaction mixture is stirred at 10° to 15° C. for 5 hours, at room temperature for 15 hours and then at 40° C. for 30 minutes. After cooling to room temperature, it is brought to pH 1 with 250 parts of concentrated hydrochloric acid and stirred at room temperature for 1 hour. It is washed with three portions of 500 parts of 1N hydrochloric acid. The moist product of the formula

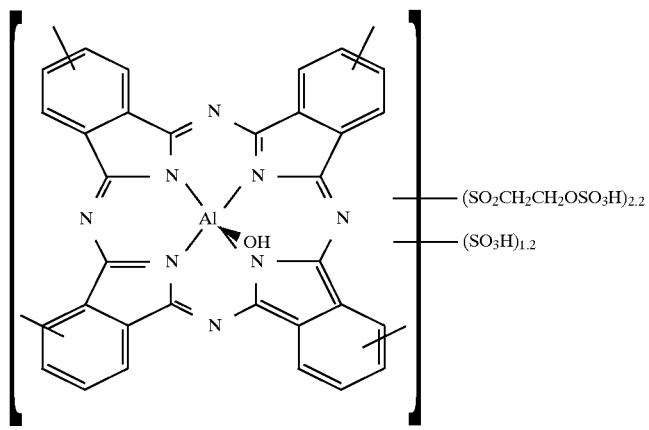

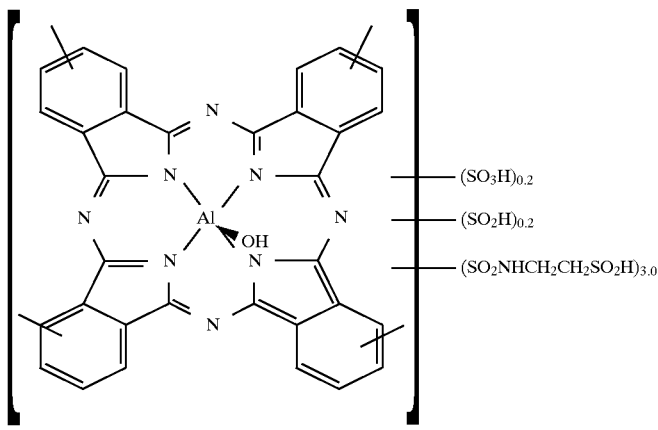

is used directly for the further reaction.

Example 6
Reaction with chloroethanol and esterification 200 parts of aluminum phthalocyanine sulfonamidoethylsulfinate from Example 5 are introduced into 2,000 parts of water and a pH of 7.3 is established with 2N NaOH. 56.4 parts of 2-chloroethanol are then added dropwise and the temperature is increased to 65° C. During the entire reaction time of 20 hours, the pH is kept at 9.5–9.6 with 2N sodium hydroxide solution. The mixture is then brought to pH 6.8 with dilute hydrochloric acid and the precipitate is filtered off with suction and dried.

100 parts of hydroxy-dyestuff are then introduced into 540 parts of sulfuric acid monohydrate at 15° to 20° C. and the mixture is stirred at 20° C. for 12 hours. The reaction mixture is poured onto 2,600 parts of ice and the precipitate is filtered off with suction and washed with a total of 2,500 ml of 5% strength hydrochloric acid. The press-cake is introduced into 750 parts of water and dissolved at a pH of 6 with 2N sodium hydroxide solution. The reactive dyestuff is isolated by drying in a vacuum cabinet or by salting out.

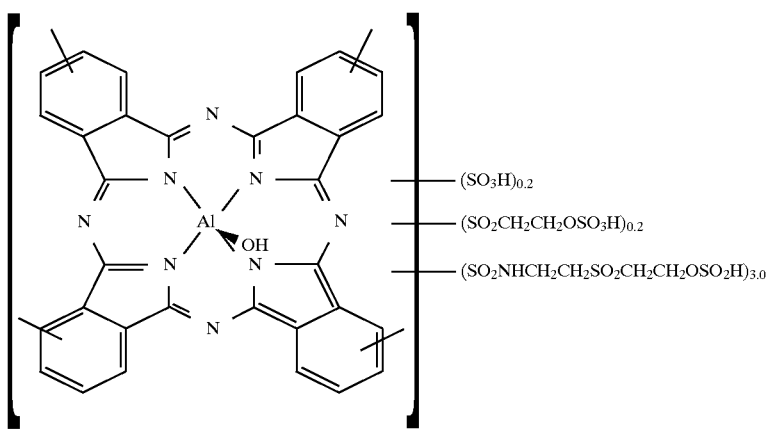

A green product with a lambda$_{max}$=670 nm in H$_2$O is obtained. The reactive dyestuff is readily soluble in water and gives brilliant green prints and dyeings with good fastness properties on cotton fibers.

Example 7
Aluminum phthalocyanine sulfomorpholinosulfinate 180 parts of aluminum phthalocyanine trisulfochloride from Example 2a are introduced into 300 parts of water at 5° to 10° C. A pH of 8 is established with sodium bicarbonate, and 4.3 parts of morpholine are added dropwise at 10° to 15° C. in the course of 5 minutes. After 15 minutes, the reaction mixture is introduced into a solution of 95 parts of sodium sulfite and 28 parts of sodium bicarbonate in 1,600 parts of water. The reaction mixture is stirred at 10° to 15° C. for 5 hours, at room temperature for 15 hours and then at 40° C. for 30 minutes.

After cooling to room temperature, the mixture is brought to pH 1 with 310 ml of concentrated HCl and stirred at room temperature for 1 hour. It is washed with three portions of 500 parts of 1N hydrochloric acid. The moist product of the formula

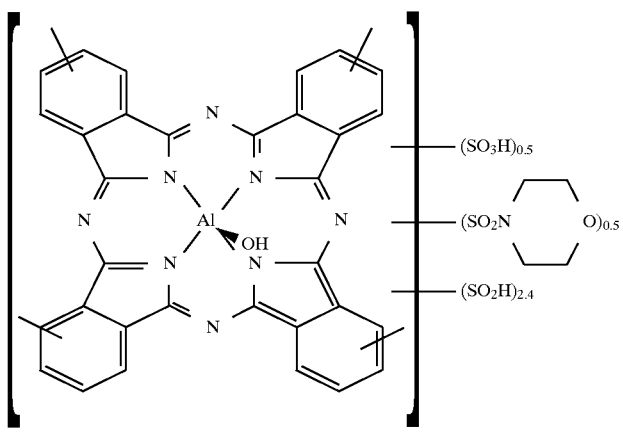

is used directly for the further reaction.

Example 8
Reaction with chloroethanol and esterification 190 parts of aluminum phthalocyanine sulfomorpholinosulfinate from Example 7 are introduced into 2,000 parts of water and a pH of 7.3 is established with 2N NaOH. 56.4 parts of 2-chloroethanol are then added dropwise and the temperature is increased to 65° C. During the entire reaction time of 20 hours, the pH is kept at 9.5–9.6 with 2N sodium hydroxide solution. The mixture is then brought to pH 6.8 with dilute hydrochloric acid and the precipitate is filtered off with suction and dried. 91 parts of hydroxy-dyestuff are then introduced into 540 parts of sulfuric acid monohydrate at 15° to 20° C. and the mixture is stirred at 20° C. for 12 hours. The reaction mixture is poured onto 2,600 parts of ice and the precipitate is filtered off with suction and washed with a total of 2,500 ml of 5% strength hydrochloric acid. The press-cake is introduced into 750 parts of water and the mixture is dissolved at a pH of 6 with 2N sodium hydroxide solution. The reactive dyestuff is isolated by drying in a vacuum cabinet or by salting out.

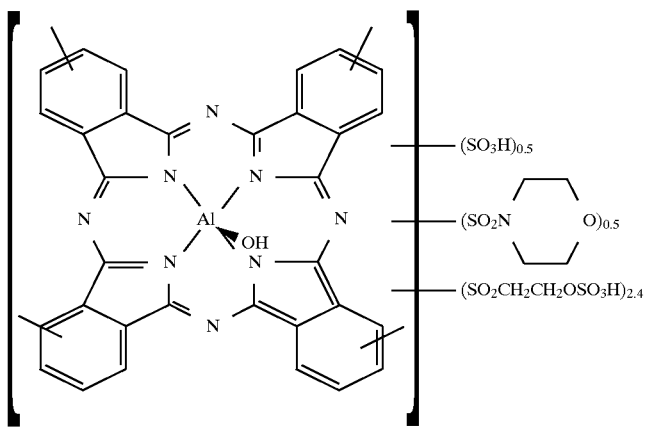

A green product with a lambda$_{max}$=672 nm in H$_2$O is obtained. The reactive dyestuff is readily soluble in water and gives brilliant green prints and dyeings with good fastness properties on cotton fibers.

Example 9
Aluminum phthalocyanine β-aminoethylsulfone+cyanuric chloride with 3-(β-sulfatoethylsulfonyl)aniline A mixture of 150 parts of 25% strength ammonia solution and 500 parts of water is cooled to 10° C. and 135 parts of reactive dyestuff from Example 4b are added in the course of 10 minutes. After 1 hour, the mixture is warmed to room temperature and a pH of 6.5 is established with 2N hydrochloric acid. The precipitate is filtered off with suction and washed with 5% strength NaCl solution. A product of the formula

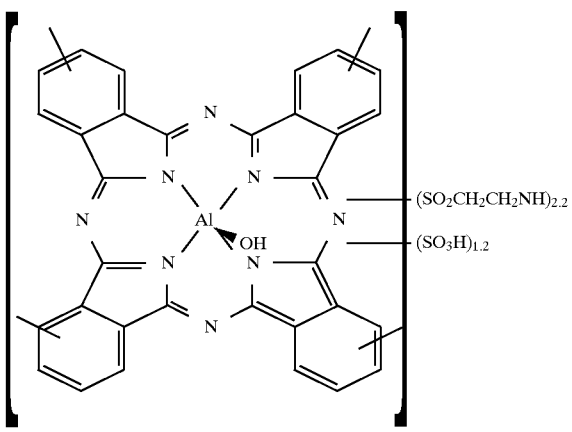

is obtained.

45 parts of cyanuric chloride are introduced into 250 parts of water and 250 parts of ice and the mixture is stirred for 30 minutes while cooling with ice. 63 parts of 3-(β-sulfatoethylsulfonyl)aniline are introduced into 250 parts of water and dissolved at pH 5 with sodium bicarbonate, while cooling at 5° C. This solution is introduced into the suspension of cyanuric chloride. The mixture is stirred for 2 hours at 5° C. and the pH is kept in the range from 3 to 3.5 with sodium carbonate solution. The moist precipitate of the aminoethylsulfone-dyestuff compound is then added and the mixture is stirred at room temperature for 1 hour. The pH is brought to 6.5 with sodium carbonate. The reaction solution is then heated to 40° C. and the pH is kept in the range from 6 to 6.5 for 6 hours by addition of sodium carbonate. The dyestuff is salted out with sodium chloride, filtered off with suction and washed with 5% strength NaCl solution.

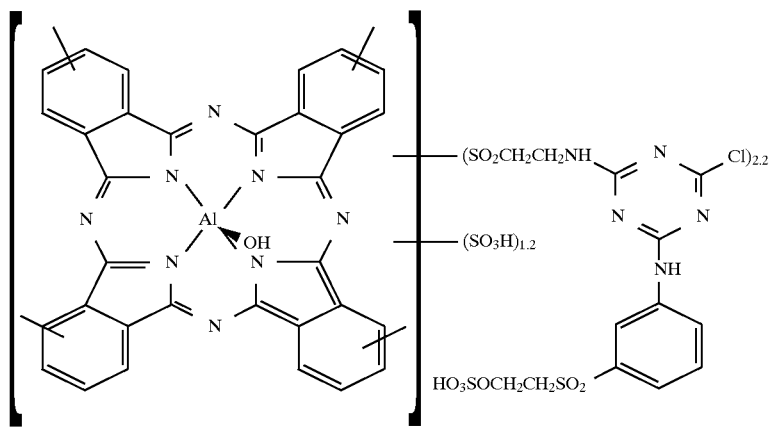

A green product with a lambda$_{max}$=675 nm in H$_2$O is obtained. The reactive dyestuff is readily soluble in water and gives brilliant green prints and dyeings with good fastness properties on cotton fibers.

We claim:

1. An aluminum phthalocyanine of the formula (1)

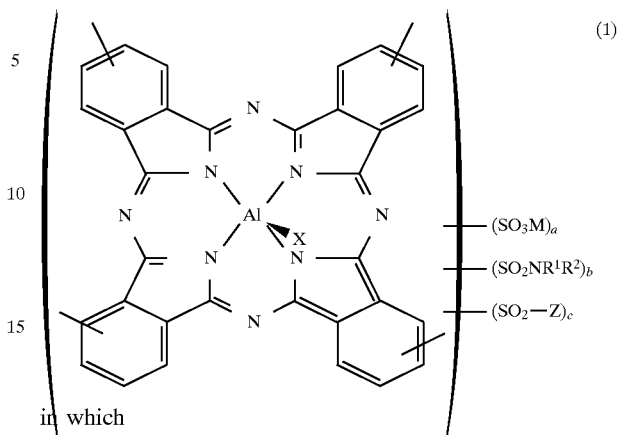

in which

X is Cl or OH;

Z is vinyl or a group of the formula —CH$_2$CH$_2$—Y, in which Y is a substituent which can be eliminated under alkaline conditions;

a is a number from 0 to 3;

b is a number from 0 to 4;

c is a number from 0.5 to 4;

M is hydrogen, an alkali metal or a substituted or unsubstituted ammonium ion; and R$^1$ and R$^2$ independently of one another are hydrogen, C$_1$–C$_6$-alkyl, a C$_1$–C$_6$-alkyl which is substituted by one or two radicals of the formulae OH, SO$_3$M or OSO$_3$M, phenyl, a phenyl which is substituted by one to three radicals of the fomulae OH, SO$_3$M or COOM or a radical of the formulae (2), (3) or (4)

in which n is a number from 0 to 3, m is the number 0 or 1, where the sum n+m is 1, 2, 3 or 4,
x is an integer from 2 to 6,
y is a number from 0 to 3,
W is $C_1$–$C_6$-alkylene, —$(CH_2)_2$—O—$(CH_2)_2$— or a chemical bond and
$Y^1$ is —CH=$CH_2$, —$CH_2CH_2Cl$, —$CH_2CH_2OH$ or —$CH_2CH_2OSO_3M$;
or $R^1$ and $R^2$, together with the adjacent nitrogen atom, form a 5 to 7-membered saturated or unsaturated N-heterocyclic radical, or, with a further hetero group selected from the group consisting of —O—, —S—, —$SO_2$—, —N= and =$NR^3$, in which $R^3$ is hydrogen, $C_1$–$C_4$-alkyl, $C_1$–$C_4$-hydroxyalkyl, $C_1$–$C_4$-hydroxyalkyl, $C_1$–$C_4$-chloroalkyl or $C_1$–$C_4$-sulfatoalkyl, form a 5- to 8-membered saturated or unsaturated heterocyclic radical.

2. An aluminum phthalocyanine as claimed in claim 1, in which Y is chlorine, sulfato, thiosulfato, acetato or phosphato.

3. An aluminum phthalocyanine as claimed in claim 1, in which
X is OH;
Z is vinyl or is a group of the formula —$CH_2$—$CH_2$—Y in which Y is a substituent which can be eliminated under alkaline conditions;
the sum a+b+c is a number between 2.0 and 4.0;
M is hydrogen, lithium, sodium, potassium, ammonium, a mono-, di-, tri- or tetramethylammonium ion, a mono-, di-, tri- or tetraethylammonium ion or a mono-, di- or triethanolammonium ion and
$R^1$ and $R^2$ independently of one another are hydrogen, $C_1$–$C_4$-alkyl, $C_1$–$C_4$-sulfoalkyl or $C_1$–$C_4$-sulfatoalkyl, or together with the adjacent N-atom are a heterocyclic radical of the formulae

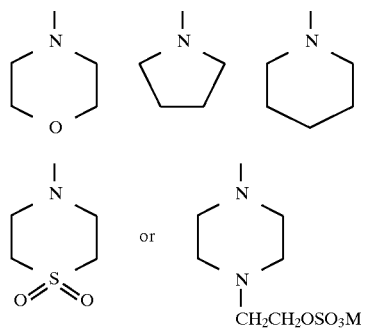

4. An aluminum phthalocyanine as claimed in claim 1, in which
X is OH;
a is a number from 0 to 3;
b is a number from 0.5 to 2.0;
c is a number from 0.5 to 4.0; and
$R^1$ and $R^2$ independently of one another are H, $CH_3$, $C_2H_5$, $CH_2CH_2SO_3M$ or $CH_2CH_2OSO_3M$, or, together with the adjacent N atom, form a heterocyclic radical of the formula

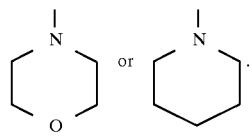

5. An aluminum phthalocyanine as claimed in claim 1, in which
X is OH;
a is a number from 0 to 3;
b is a number from 0.5 to 2.0;
c is a number from 0.5 to 4.0;
$R^1$ is hydrogen;
$R^2$ is a radical of the formula (2) or (4), in which x is the number 2, m is the number 1, n is the number 0, W is a chemical bond and $Y^1$ is vinyl or β-sulfatoethyl and
Z is vinyl or β-sulfatoethyl.

6. An aluminum phthalocyanine as claimed in claim 1, in which
X is OH;
a is a number from 0 to 3;
b is the number 0;
c is a number from 0.5 to 4.0.

7. An aluminum phthalocyanine as claimed in claim 1, in which
X is OH;
a is a number from 0 to 3;
b is the number 0;
c is a number from 0.5 to 4.0; and
Z is vinyl or β-sulfatoethyl.

8. A process for the preparation of a compound of the formula (1) as claimed in claim 1, which comprises reducing the acid chloride of the formula (5)

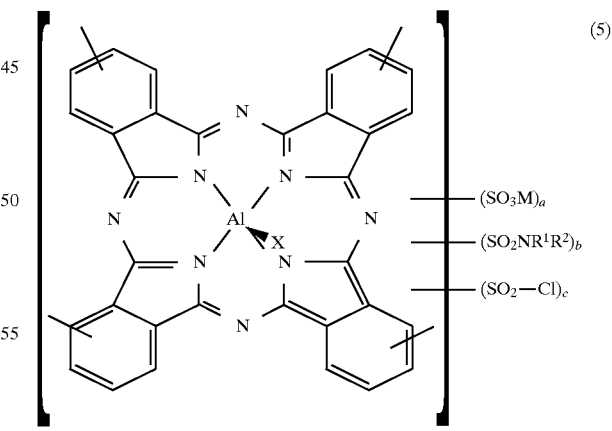

to the sulfinic acid of the formula (6)

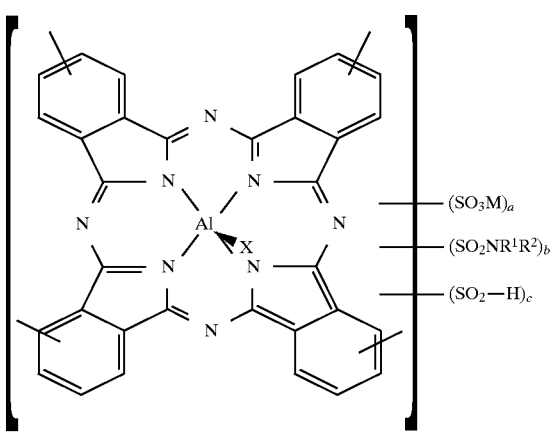

ethoxylating the compound of the formula (6) to give the compound of the formula (1a)

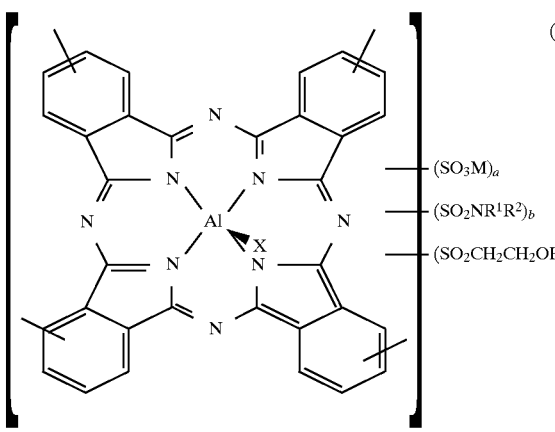

and optionally chlorinating, sulfating, thiosulfating, phosphorylating or acetylating the compound of the formula (1a), a compound of the formula (1) where Z is —CH$_2$CH$_2$Cl, —CH$_2$CH$_2$OSO$_3$M, —CH$_2$CH$_2$SSO$_3$M, —CH$_2$CH$_2$OPO$_3$M or —CH$_2$COOM being formed, which, optionally, is subjected to an elimination reaction, a compound of the formula (1) where Z is vinyl being formed, optionally reacting a compound of the formula (1) where Z is vinyl, β-sulfatoethyl, β-thiosulfatoethyl, β-phosphatoethyl or β-acetatoethyl with an amine of the formula H$_2$NR, a compound of the formula (1) where Z is —CH$_2$CH$_2$NHR being formed, which, after its intermediate isolation, is reacted with a heterocyclic compound of the formula Hal-T, where Hal is chlorine or fluorine, a compound of the formula (1) where Z is —CH$_2$CHNR—T being formed;

or, to prepare a compound of the formula (1) where Z is —CH$_2$CH$_2$SO$_3$M, either reacting a compound of the formula (6) with 1-chloroethane-2-sulfonic acid, or reacting a compound of the formula (1) where Z is vinyl with M$_2$SO$_3$.

9. A process for the preparation of a compound of the formula (1) as claimed in claim 1, which comprises partly reducing a compound of the formula (7)

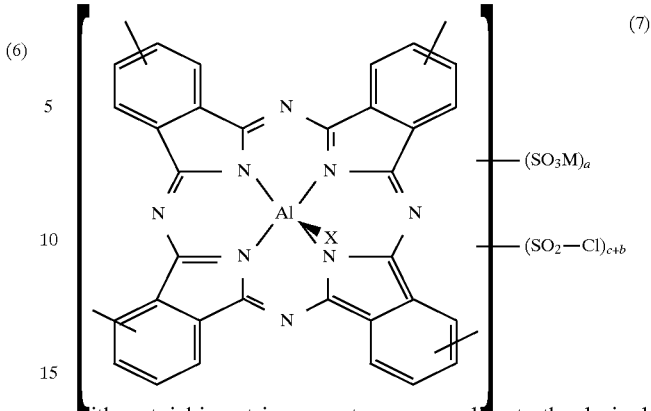

with a stoichiometric amount, corresponding to the desired number c, of a reducing agent to give the sulfinic acid and then reacting this with an amine of the formula HNR$^1$R$^2$, a compound of the formula (6)

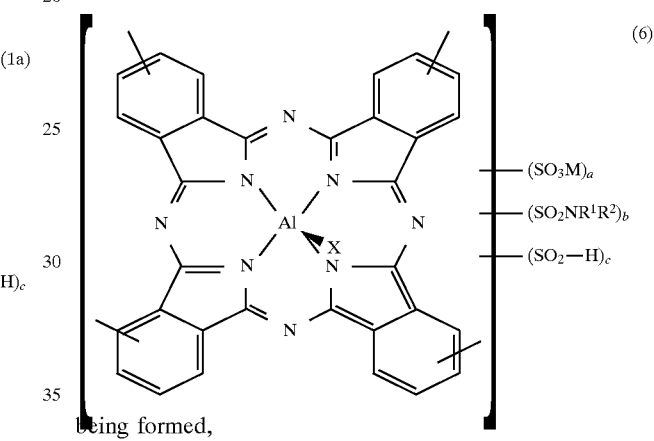

being formed,
ethoxylating the compound of the formula (6) to give the compound of the formula (1a)

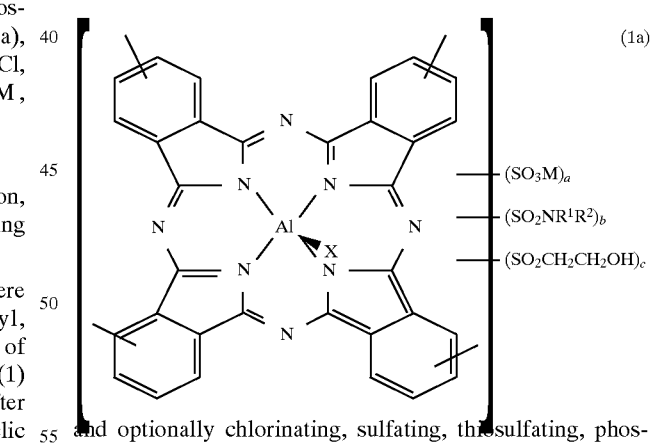

and optionally chlorinating, sulfating, thiosulfating, phosphorylating or acetylating the compound of the formula (1a), a compound of the formula (1) where Z is —CH$_2$CH$_2$Cl, —CH$_2$CH$_2$OSO$_3$M, —CH$_2$CH$_2$SSO$_3$M, —CH$_2$CH$_2$OPO$_3$M or —CH$_2$COOM being formed, which, optionally, is subjected to an elimination reaction, a compound of the formula (1) where Z is vinyl being formed, optionally reacting a compound of the formula (1) where Z is vinyl, β-sulfatoethyl, β-thiosulfatoethyl, β-phosphatoethyl or β-acetatoethyl with an amine of the formula H$_2$NR, a compound of the formula (1) where Z is —CH$_2$CH$_2$NHR being formed, which, after its intermediate isolation, is reacted with a heterocyclic compound of the formula Hal-T, where Hal is chlorine or fluorine, a compound of the formula (1) where Z is —CH$_2$CHNR-T being formed;

or, to prepare a compound of the formula (1) where Z is —CH$_2$CH$_2$SO$_3$M, either reacting a compound of the formula (6) with 1-chloroethane-2-sulfonic acid, or reacting a compound of the formula (1) where Z is vinyl with M$_2$SO$_3$.

10. A process for the preparation of a compound of the formula (1) as claimed in claim 1, which comprises reacting a compound of the formula (7)

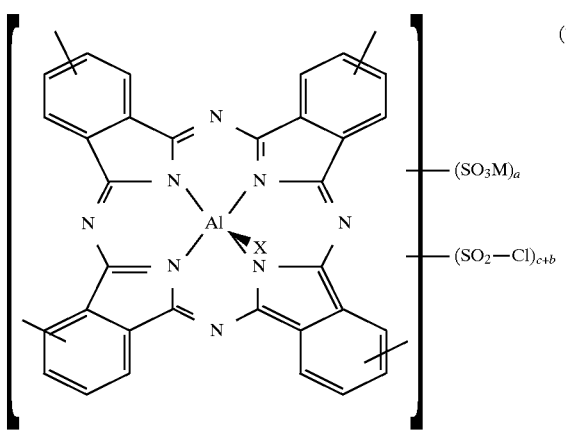

(7)

with a stoichiometric amount, corresponding to the desired number b, of an amine of the formula HNR$^1$R$^3$ to give a compound of the formula (5)

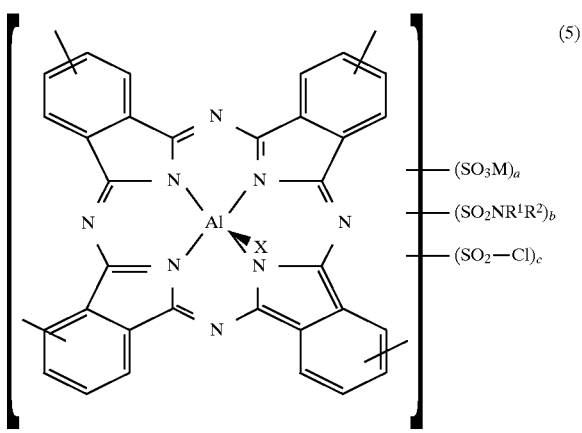

(5)

and further reducing the compound of the formula (5) to the sulfinic acid of the formula (6)

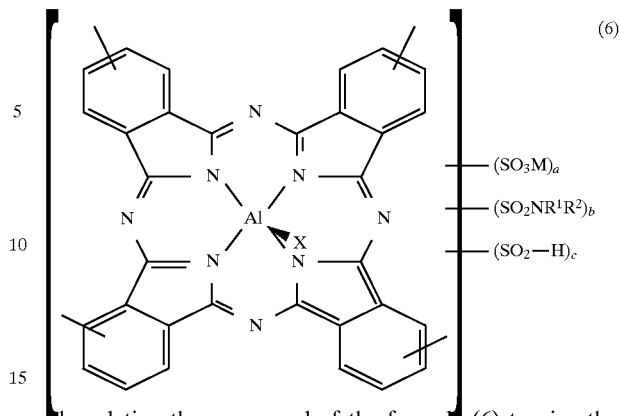

(6)

ethoxylating the compound of the formula (6) to give the compound of the formula (1a)

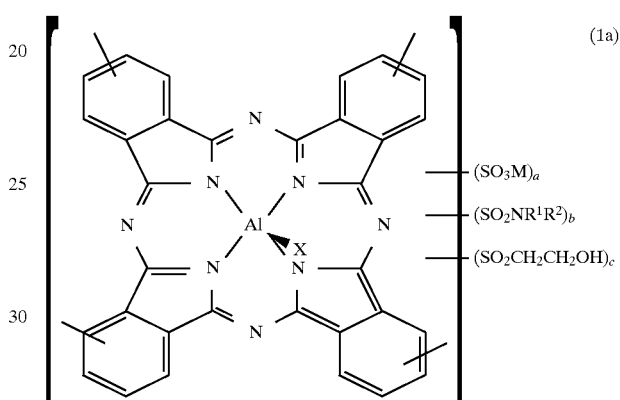

(1a)

and optionally chlorinating, sulfating, thiosulfating, phosphorylating or acetylating the compound of the formula (1a), a compound of the formula (1) where Z is —CH$_2$CH$_2$Cl, —CH$_2$CH$_2$OSO$_3$M, —CH$_2$CH$_2$SSO$_3$M, —CH$_2$CH$_2$OPO$_3$M or —CH$_2$COOM being formed, which, optionally, is subjected to an elimination reaction, a compound of the formula (1) where Z is vinyl being formed, optionally reacting a compound of the formula (1) where Z is vinyl, β-sulfatoethyl, β-thiosulfatoethyl, β-phosphatoethyl or β-acetatoethyl with an amine of the formula H$_2$NR, a compound of the formula (1) where Z is —CH$_2$CH$_2$NHR being formed, which, after its intermediate isolation, is reacted with a heterocyclic compound of the formula Hal-T, where Hal is chlorine or fluorine, a compound of the formula (1) where Z is —CH$_2$CHNR-T being formed;

or, to prepare a compound of the formula (1) where Z is —CH$_2$CH$_2$SO$_3$M, either reacting a compound of the formula (6) with 1-chloroethane-2-sulfonic acid, or reacting a compound of the formula (1) where Z is vinyl with M$_2$SO$_3$.

11. A process for the preparation of a compound of the formula (1b)

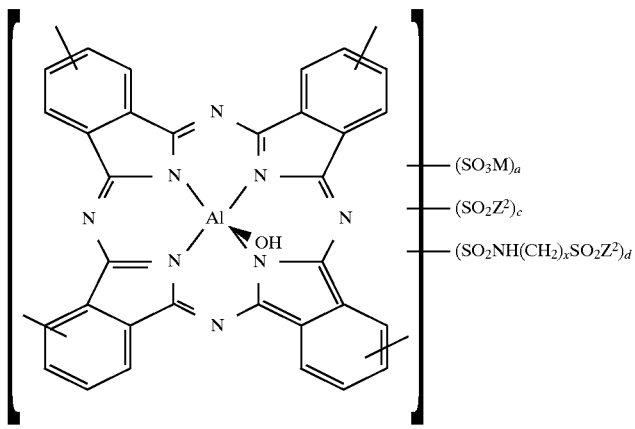

in which a is a number from 0 to 3.0;
c is a number from 0.5 to 4.0;
d is a number from 0.5 to 2.0;
x is a number from 2 to 6;
$Z^2$ is vinyl or β-sulfatoethyl and M is hydrogen, an alkali metal or a substituted or unsubstituted ammonium ion, which comprises reacting a compound of the formula (7a)

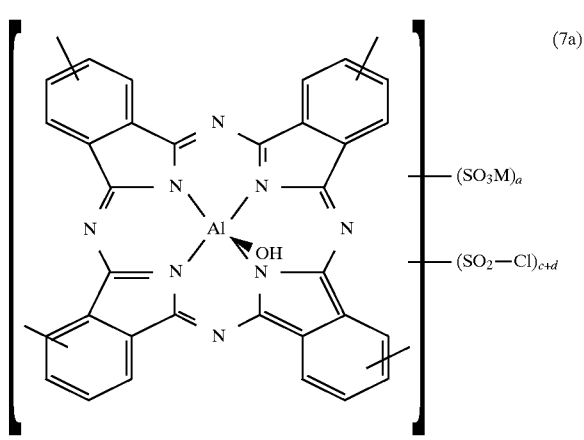

with a stoichiometric amount, corresponding to the desired number d, of an alkylaminosulfonic acid of the formula $H_2N$—$(CH_2)_x$—$SO_3M$ under alkaline conditions to give a compound of the formula (8), the $SO_2Cl$ groups corresponding to the number c being hydrolyzed, reacting the compound of the formula (8) with chlorosulfonic acid and thionyl chloride, the sulfo groups of the sulfonamidoalkyl radical and some of the sulfo groups bonded directly to the phthalocyanine chromophore being converted into $SO_2Cl$ groups; reducing the resulting reaction product with a reducing agent, sulfinic acid groups being formed from the $SO_2Cl$ groups; ethoxylating the resulting reaction product, the sulfinic acid radicals being converted into hydroxyethylsulfonyl radicals; and subsequently sulfating the product, a compound of the formula (1 b) where $Z^2$ is (β-sulfatoethyl being formed, which, optionally, is subjected to an elimination reaction to give a compound of the formula (1b) where $Z^2$ is vinyl.

12. The method of dyeing and printing material containing hydroxyl or carboxamide groups or a blend thereof, comprising the step of applying an aluminum phthalocyanine of the formula (1) as claimed in claim 1 to said material.

13. The method as claimed in claim 12, wherein the material is a cellulosic fiber material.

14. The aluminum phthalocyanine as claimed in claim 1, wherein $R^1$ and $R^2$ together with the adjacent nitrogen atom, form a 5 to 6-membered saturated or unsaturated N-heterocyclic radical.

* * * * *